United States Patent

Sato

Patent Number: 5,734,738
Date of Patent: Mar. 31, 1998

[54] ULTRASONIC DIAGNOSING APPARATUS

[75] Inventor: Takeshi Sato, Tochigi-ken, Japan

[73] Assignee: Kabushiki Kaisha Toshiba, Kawasaki, Japan

[21] Appl. No.: 288,223

[22] Filed: Aug. 9, 1994

Related U.S. Application Data

[63] Continuation of Ser. No. 857,583, Mar. 25, 1992, abandoned.

[30] Foreign Application Priority Data

Mar. 26, 1991 [JP] Japan ................................. 3-062036

[51] Int. Cl.$^6$ ........................................ G06K 9/00
[52] U.S. Cl. ................ 382/128; 382/236; 348/398; 128/660.01
[58] Field of Search ................ 382/1, 6, 54, 128, 382/130, 236; 348/163, 398–415; 364/413.25; 73/602, 628; 367/7; 128/660.01, 660.02

[56] References Cited

U.S. PATENT DOCUMENTS

| | | | |
|---|---|---|---|
| 4,310,907 | 1/1982 | Tachita et al. | 358/112 |
| 4,729,019 | 3/1988 | Rouvrais | 358/112 |
| 4,785,818 | 11/1988 | Hardin | 358/112 |
| 5,050,226 | 9/1991 | Collet-Billon | 382/54 |
| 5,060,515 | 10/1991 | Kanda et al. | 73/602 |
| 5,067,015 | 11/1991 | Combridge et al. | 348/398 |
| 5,111,823 | 5/1992 | Cohen | 128/660.07 |
| 5,224,175 | 6/1993 | Gouge et al. | 382/6 |
| 5,241,473 | 8/1993 | Ishihara et al. | 364/413.25 |

FOREIGN PATENT DOCUMENTS 0231048  1/1987  European Pat. Off. .

OTHER PUBLICATIONS

Digital Signal Processing of Image, T. Fukinuki, The Nikkan Kogyo Shimbun Ltd., May 25, 1981, pp. 115–118 no translation.

Patent Abstracts of Japan, vol. 15, No. 92 (C–0811), Mar. 6, 1991 Abstract of JP–A–2 305 563 (Toshiba Corp.), 19 Dec. 1990.

Patent Abstracts of Japan, vol. 14, No. 543 (C–783)30, Nov. 1990 Abstract of JP–A–2 228 950 (Toshiba Corp.) 11 Sep. 1990.

P. Roos et al, "Reversible Interframe Compression of Medical Images . . . " Dec. 1991 pp. 538–545.

Primary Examiner—Leo Boudreau
Assistant Examiner—Chris Kelley
Attorney, Agent, or Firm—Finnegan, Henderson, Farabow, Garrett & Dunner, L.L.P.

[57] ABSTRACT

An object to be examined is scanned with an ultrasonic wave and a tomographic image of the object is obtained on the basis of reflected ultrasonic waves. This image is stored in a frame memory. The types of the motion of the image, i.e., a still image, a motion image and a slight motion are detected on the basis of the difference in image data between the current tomographic image and a past tomographic image, and the correlation between rasters of the current tomographic image. The correlation coefficient used for frame correlation processing between the current tomographic image and the past tomographic image is adaptively changed in accordance with the detection result.

5 Claims, 4 Drawing Sheets

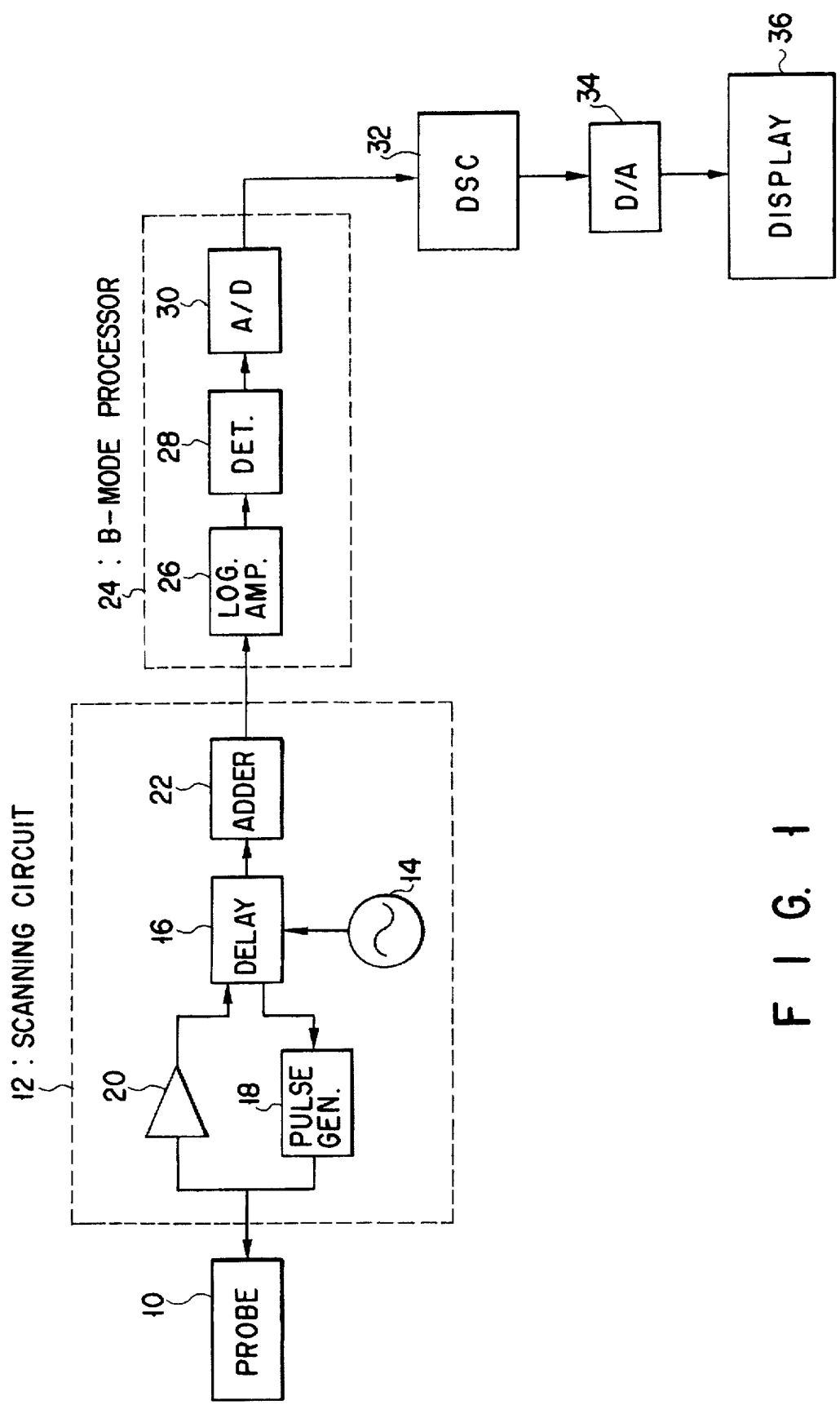
F I G. 1

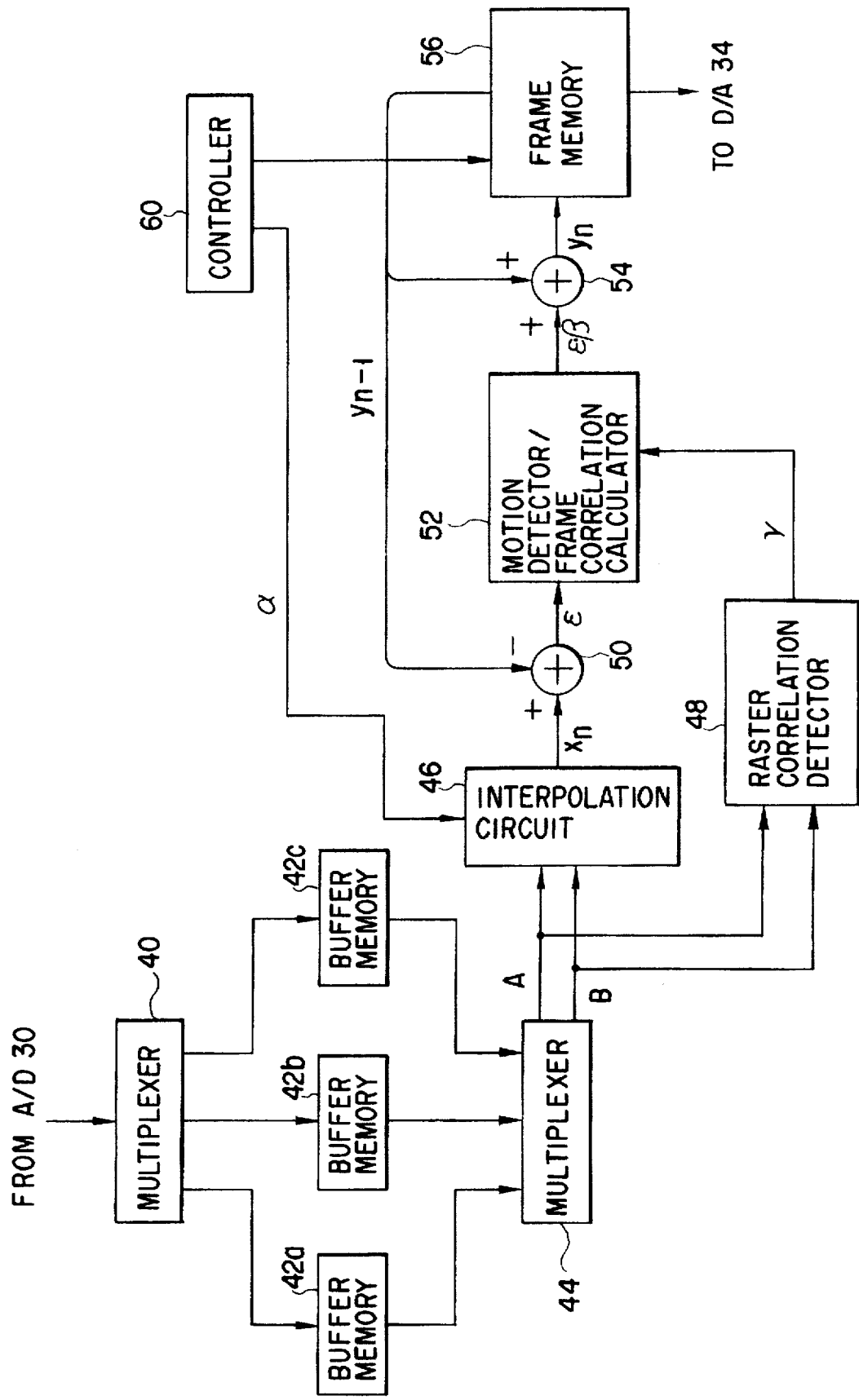
F I G. 2

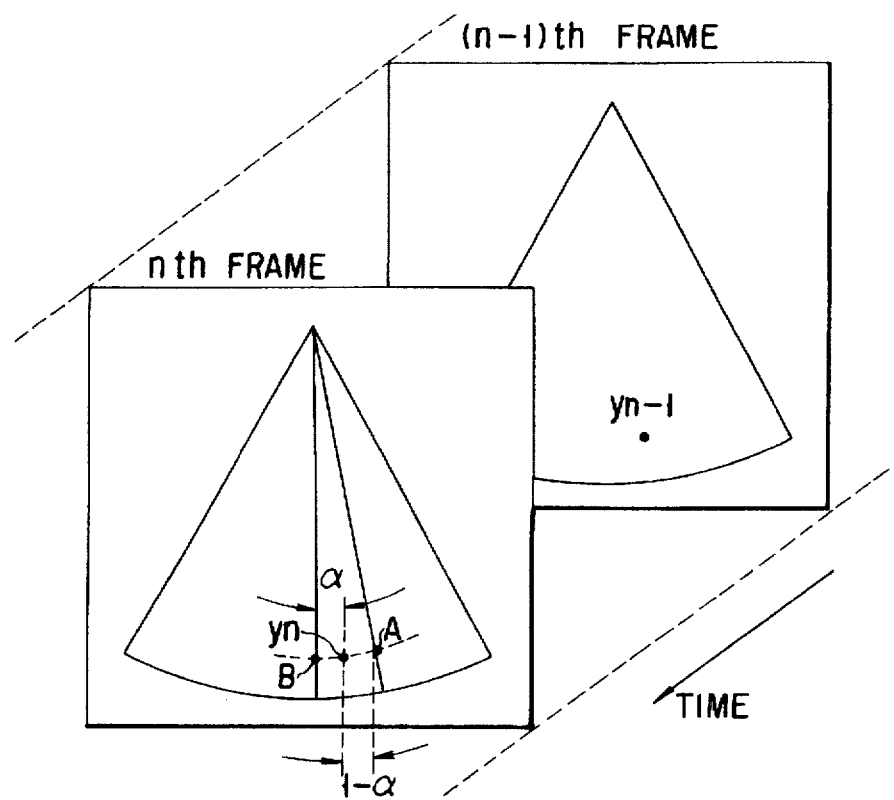
F I G. 3
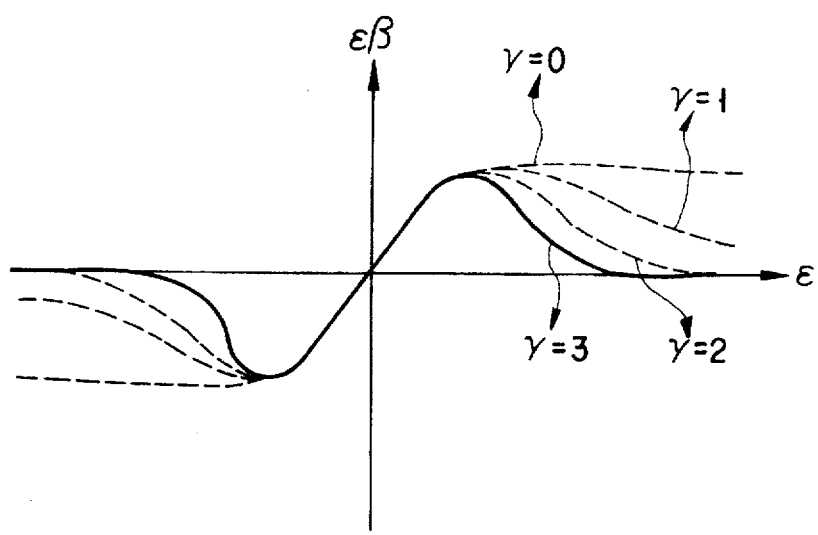
F I G. 4

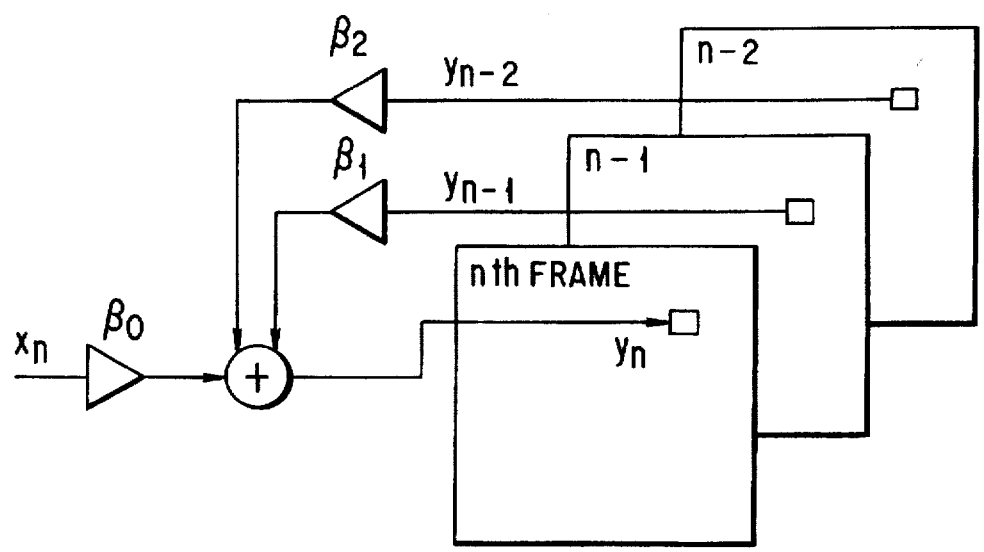
F I G. 5
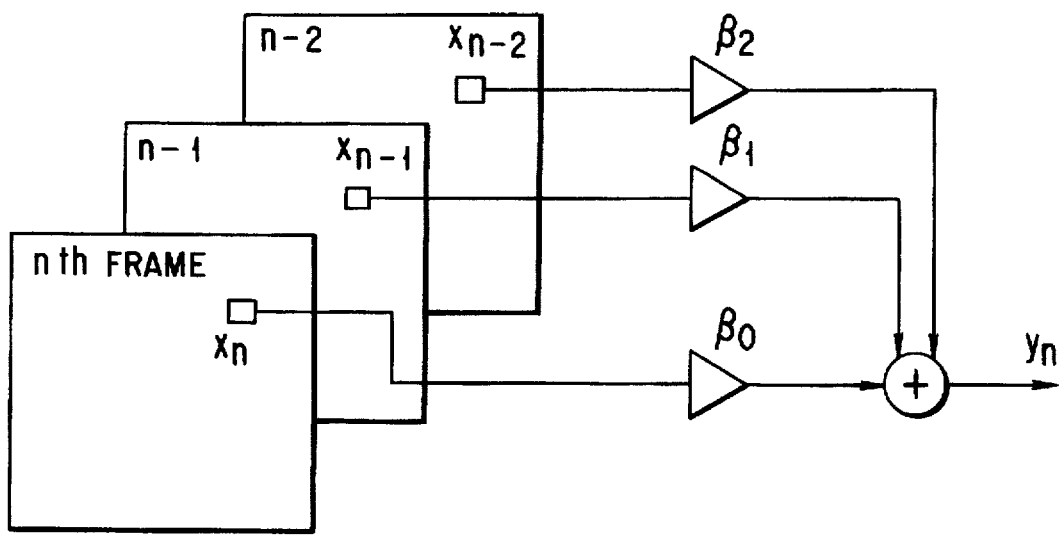
F I G. 6

1

ULTRASONIC DIAGNOSING APPARATUS

This application is a continuation of application Ser. No. 07/857,583, filed Mar. 25, 1992, now abandoned.

BACKGROUND OF THE INVENTION

1. Field of the Invention

The present invention relates to an ultrasonic diagnosing apparatus for scanning an object to be examined with an ultrasonic wave and obtaining a tomographic image of the object on the basis of a reflected ultrasonic wave.

2. Description of the Related Art

Such an ultrasonic diagnosing apparatus is designed to detect the envelope of a reflected ultrasonic wave in each scanning line (raster), luminance-modulate the intensity of each reflected wave, and synthesize the modulated reflected waves in all the scanning lines to obtain a tomographic image. In this apparatus, in order to increase the S/N ratio of an image, it is desired to remove or reduce random noises contained in each image signal (noise reduction).

As a general method of reducing noise, low-pass filter processing with respect to the time axis (between frames) of image signals is known. This method is also called a frame correlation method. Assume that image signals of n (n>2) frames are simply averaged. In this case, if signal components of an image exhibit no change between frames, the value of each signal component coincides with the averaged value. However, since a random noise exhibits no correlation between frames, the noise is reduced to 1/n in power and to $1/\sqrt{n}$ in averaged amplitude. That is, the S/N ratio is increased in proportion to $\sqrt{n}$. With this simple frame correlation processing, the random noise in a still portion of the image can be reduced, however, that in a motion portion cannot be reduced. Rather, the motion portion of the image is blurred.

In order to solve this problem, a method of adaptively changing the frame correlation coefficient by detecting the motion of an image, called a motion adaptive frame correlation scheme, is being considered in general television image processing, although this method is not specifically intended for ultrasonic images. This method is disclosed in T. Fukinuki, "Digital Signal Processing of Image", The Nikkan Kogyo Shimbun Ltd., May 25, 1981, chap., 7.3.3., "Noise Reduction of Image," pp.115–118. In this method, when the motion of an image is detected, the coefficient is changed to weaken the correlation. Therefore, only weak correlation processing can be performed such that the degree of blurring falls within an allowable range when the image includes the motion portion.

Further, in a general television image, if the relative positional relationship between a camera and an object to be picked-up is constant, no change in signal component occurs. With regard to an ultrasonic diagnosing apparatus, however, even if a probe is not moved, the path of an ultrasonic wave is slightly changed due to a slight motion of a patient, caused by respiration or heartbeat. This changes the interference condition of the ultrasonic wave, and generates pattern noise called a speckle pattern, which is a gradation change unique to an ultrasonic image. Since a motion detector of the conventional motion adaptive frame correlation scheme detects such a slight change causing a speckle pattern as a motion of an image, the correlation is excessively weakened.

SUMMARY OF THE INVENTION

The present invention has been made in consideration of the above situation, and has as its object to provide an ultrasonic diagnosing apparatus which can efficiently remove only noises including random noises and speckle pattern noises while preventing blurring of signal components by setting a proper frame correlation coefficient, thereby obtaining a tomographic image with a high S/N ratio.

According to the present invention, there is provided an ultrasonic diagnosing apparatus for scanning an object to be examined with an ultrasonic wave and obtaining a tomographic image of the object on the basis of the reflected ultrasonic wave, comprising filter means for performing correlation processing between a current tomographic image and a past tomographic image, means for detecting a motion of an image in accordance with a difference in image data between the current tomographic image and the past tomographic image and correlation between rasters of the current tomographic image, and means for changing a correlation coefficient in frame correlation processing performed by the filter means in accordance with a detection result obtained by the motion detecting means.

According to the ultrasonic diagnosing apparatus of the present invention, a slight change causing a speckle pattern and a change in signal component of an image are separately detected, and the frame correlation coefficient is changed in accordance with the result of detection. Therefore, proper correlation processing can always be performed to obtain a tomographic image with a high S/N ratio.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 is a block diagram showing the arrangement of an ultrasonic diagnosing apparatus according to the first embodiment of the present invention;

FIG. 2 is a block diagram showing a detailed arrangement of a digital scan converter in the first embodiment;

FIG. 3 is a view for explaining an interpolating operation in the first embodiment;

FIG. 4 is a graph for explaining an operation of a motion detector/frame correlation calculator in the first embodiment;

FIG. 5 shows a first modification of the adaptive filter circuit which is formed of a recursive digital filter of third order; and FIG. 6 shows a second modification of the adaptive filter circuit which is formed of a nonrecursive digital filter.

DETAILED DESCRIPTION OF THE PREFERRED EMBODIMENTS

A preferred embodiment of an ultrasonic diagnosing apparatus according to the present invention will now be described with reference to the accompanying drawings.

FIG. 1 is a block diagram showing a schematic arrangement of the first embodiment. A scanning circuit 12 is connected to an electronic sector scanning type ultrasonic probe 10. The probe 10 is constituted by a large number of ultrasonic transducers arranged in a line. The probe 10 can scan an object to be examined with an ultrasonic beam of which radiation direction is changed in the form of a sector or can focus the ultrasonic beam by changing the application timing of a voltage applied to each transducer. Note that the probe 10 is not limited to an electronic sector scanning type but may be a linear scanning type or mechanical scanning type probe.

In the scanning circuit 12, an output from an oscillator 14 for determining a frequency at which each ultrasonic transducer is vibrated is supplied to the probe 10 through a delay circuit 16 and a pulse generator 18. The pulse generator 18 supplies driving pulses (rate pulses) to the probe 10 at a predetermined period. The reciprocal of this period is the repeating frequency of an ultrasonic beam. The delay circuit 16 is constituted by a large number of delay lines having different delay times. Outputs from the delay lines are respectively supplied to the large number of transducers. By changing these delay times, the direction (raster direction) of an ultrasonic beam radiated from the probe 10 can be changed. The delay times, i.e., the radiation directions of ultrasonic waves, are controlled by control signals from a control section (not shown).

An output signal from the probe 10 is supplied to an adder 22 through a preamplifier 20 and the delay circuit 16. In this case, an output from each transducer is supplied to the adder 22 through a corresponding one of the delay lines with the same delay time as that in a transmission period. An output from the adder 22 is input to a B-mode processing circuit 24, and the intensity of a reflected wave of the ultrasonic beam in each raster direction is detected.

The B-mode processing circuit 24 is constituted by a logarithmic amplifier 26, an envelope detector 28 and an A/D converter 30. The logarithmic amplifier 26 logarithmically amplifies the reflected wave signal output from the adder 22. The envelope detector 28 detects the envelope of a signal from the logarithmic amplifier 26. An output from the B-mode processing circuit 24 is input, as luminance information of each raster, i.e., B-mode image (tomographic image) information, to a digital scan converter (DSC) 32. Since the raster of the ultrasonic wave from the ultrasonic probe 10 has a sector shape, and the raster of a display section 36 is formed in the lateral direction like the raster in the normal television signal, the DSC 32 outputs the image information upon changing the raster direction (scan direction) of the input image.

The monochromatic tomographic image output from the DSC 32 is supplied to the display section 36 through a D/A converter 34. Although not shown, an output from the D/A converter 34 may be supplied to a recording section such as a VCR.

The DSC 32 in this embodiment not only serves to change the scan direction but also serves as a noise reducer for removing random noises by utilizing frame correlation. FIG. 2 is a block diagram showing the DSC 32 in detail. An image signal of each raster from the A/D converter 30 is input to one-input/three-output multiplexer 40. The multiplexer 40 sequentially outputs the input image signals of the respective rasters to the first, second and third output terminals repeatedly in this order. Buffer memories 42a, 42b and 42c, each of which is capable of storing one-line (one-raster) image data, are respectively connected to the first, second and third output terminals of the multiplexer 40. That is, one of the buffer memories 42a, 42b and 42c is sequentially selected and set in a write mode by the multiplexer 40. The output terminals of the buffer memories 42a, 42b and 42c are connected to a three-input/two-output multiplexer 44. The multiplexer 44 is electrically interlocked with the multiplexer 40 in such a manner that the multiplexer 44 selects buffer memories which are not selected by the multiplexer 40, i.e., two buffer memories in which no data are currently being written, and outputs image data of two rasters prior to the raster of the currently written data.

Two output signals A and B from the multiplexer 44 are input to an interpolation circuit 46 and a raster correlation detector 48. As described above, since the raster of the ultrasonic wave scanning is the sector shape, the pixels at crossing points of the grid in the raster of the television signal cannot be obtained even if the reflected ultrasonic wave is sampled at the regular interval. Therefore, the interpolation circuit 46 obtains image data of the pixel in the television signal between image data of two adjacent rasters by interpolating these data. An interpolation coefficient α varies depending on the position of data to be interpolated and is supplied from a controller 60 for generating an address signal for a frame memory 56.

The raster correlation detector 48 detects the degree of correlation γ between the two rasters from the image data of the two rasters. An output $x_n$ from the interpolation circuit 46 is supplied to the first input terminal (+) of an adder 50. Data $y_{n-1}$ of the previous frame prior to the current frame by one is read out from the frame memory 56 and supplied to the second input terminal (−) of the adder 50. An output ε (=$x_n - y_{n-1}$) from the adder 50 and an output γ from the raster correlation detector 48 are supplied to a motion detector/frame correlation calculator 52.

The motion detector/frame correlation calculator 52 performs frame correlation processing by using a frame correlation coefficient β determined in accordance with the raster correlation degree γ and the output ε from the adder 50. An output ε×β from the motion detector/frame correlation calculator 52 is supplied to the first input terminal (+) of an adder 54. The data $y_{n-1}$ from the frame memory 56 is supplied to the second input terminal (−) of the adder 54. An output $y_n$(=ε×β+$y_{n-1}$) from the adder 54 is supplied to the frame memory 56. The frame memory 56 stores tomographic data input in units of raster directions of the ultrasonic beams, and outputs the respective pixel data of the tomographic image in accordance with the scanning sequence of the display section 36.

An operation of this embodiment will be described below. As described above, the scanning circuit 12 causes the ultrasonic probe 10 to scan the object with an ultrasonic wave of which the radiation direction is changed in the form of a sector, and reflected wave signals are envelope-detected by the B-mode processing circuit 24, thereby inputting image data of each sector raster to the DSC 32. The DSC 32 generates image data arranged in a matrix form from the image data arranged in the form of a sector raster, and writes the generated image data in the frame memory 56. Image data which does not exist on the raster of the ultrasonic beam is obtained by the interpolation circuit 46 in the following manner.

Assume that pixel data $y_n$ at a given point is obtained, as shown in FIG. 3. If pixel data at adjacent two points located on rasters on both the sides of the given point and on the same circumference on which the given point is located are respectively represented by A and B, and the distances between the given point and these adjacent points are respectively represented by 1−α and α, interpolated image data $x_n$ at the given point is obtained as follows:

$$x_n = \alpha \times A + (1-\alpha) \times B \quad (1)$$

In addition, according to the present invention, since tomographic image data is obtained by frame correlation, if a coefficient for frame correlation is represented by $\beta$, and tomographic image data at this point of a previous frame is represented by $y_{n-1}$, the tomographic image data $y_n$ of the current frame is represented as follows:

$$Y_n = \beta \times x_n + (1-\beta) \times y_{n-1}$$

$$= (x_n - y_{n-1}) \times \beta + y_{n-1}$$

$$= \epsilon \times \beta + y_{n-1} \quad (2)$$

where $\epsilon = x_n - y_{n-1}$

More specifically, the adder 50 obtains a difference $\epsilon$ between the output $x_n$ from the interpolation circuit 46 and the image data $y_{n-1}$ of a previous frame output from the frame memory 56. The motion detector/frame correlation calculator 52 obtains the product of the difference $\epsilon$ and the frame correlation coefficient $\beta$. The adder 54 then adds the product $\epsilon \times \beta$ and the image data $y_{n-1}$ of a previous frame together to obtain the pixel data $y_n$ of the current frame, as seen from equation (2).

If the frame correlation parameter $\beta$ is constant, an operation is performed in the same manner as in the conventional frame correlation without performing motion detection. If the frame correlation parameter $\beta$ is changed in two values in accordance with whether or not the image is a motion image, an operation is performed in the same manner as in the conventional motion adaptive frame correlation scheme. In the present invention, however, a slight change of the path of an ultrasonic wave due to a slight motion of the patient, caused by respiration or heartbeat and which causes only the speckle pattern, and a change in the signal component of the image are separately detected. The frame correlation coefficient $\beta$ is changed in accordance with the result of detection. Therefore, proper frame correlation processing can always be performed to obtain a tomographic image with a high S/N ratio. The raster correlation detector 48 receives the image data A and B and outputs a parameter $\gamma$ representing the following raster correlation:

If $|A-B| < th1$, then $\gamma=3$.
If $th1 \leq |A-B| < th2$, then $\gamma=2$.
If $th2 \leq |A-B| < th3$, then $\gamma=1$.
If $th3 \leq |A-B|$, then $\gamma=0$.

where th1, th2 and th3 are constants, and th1<th2<th3. Thus, the value of the parameter $\gamma$ is decreased as the degree of raster correlation is increased.

Subsequently, the motion detector/frame correlation calculator 52 performs a nonlinear arithmetic operation for calculating $\epsilon \times \beta$ in accordance with the value $\epsilon$ as shown in FIG. 4. When the absolute value of $\epsilon$ is small, the absolute value of $\epsilon \times \beta$ is small. When the absolute value of $\epsilon$ is increased, the absolute value of $\epsilon \times \beta$ is also increased. When the absolute value of $\epsilon$ exceeds a predetermined value, the absolute value of $\epsilon \times \beta$ is decreased. The nonlinear arithmetic operation of the motion detector/frame correlation calculator 52 is classified into four patterns in accordance with the parameter $\gamma$ as shown in FIG. 4.

By defining the frame correlation coefficient $\beta$ in this manner, the following effects can be obtained. The effects in actual conditions will be described below with reference to Table 1 and Table 2. Table 1 shows changes in the difference $\epsilon$ between frames and changes in raster correlation parameter $\gamma$ for each of the signal component, random noise component and speckle pattern component in accordance with the types of image (the types of motion of the probe in the case of the ultrasonic diagnosing apparatus). Table 2 shows the tendency of the frame correlation coefficient $\beta$ with respect to the values $\gamma$ and $\epsilon$ and corresponds to FIG. 4.

TABLE 1

| Component | Still Image $\epsilon$ | Still Image $\gamma$ | Slight Motion $\epsilon$ | Slight Motion $\gamma$ | Motion Image $\epsilon$ | Motion Image $\gamma$ |
| --- | --- | --- | --- | --- | --- | --- |
| Signal | 0 | Large | Small | Large | Large | Large |
| Random Noise | Large | Small | Large | Small | Large | Small |
| Speckle Pattern | 0 | Large | Large | Middle | Large | Middle |

TABLE 2

Tendency of $\beta$ based on $\epsilon$ and $\gamma$

| $\gamma$ | $\epsilon$ Small $\rightarrow$ Large | | | |
| --- | --- | --- | --- | --- |
| Small $\downarrow$ Large | Large Large Large | Large Large Large | Middle Middle Middle | Middle Small 0 |

(1) In a case wherein the probe is completely fixed (corresponding to "Still Image" in Table 1):

The interframe differences of the signal and the speckle pattern components are zero ($\epsilon=0$), as shown in Table 1. Therefore, even if any strong frame correlation processing is performed, these values are invariable. The speckle pattern component is zero, therefore, it is preferable not to change the value of the speckle pattern component. In contrast to this, the random noise component exhibits a large interframe difference $\epsilon$ while the raster correlation $\gamma$ is small.

As a result, in order to reduce the random noise component, the correlation coefficient $\beta$ is set to a medium value when $\epsilon$ is large and $\gamma$ is small, as shown in Table 2. The correlation coefficient $\beta$ is set to a large value when $\epsilon$ is zero and $\gamma$ is large, as shown in Table 2, so that the strong frame correlation processing is performed and the random noise can be reduced while the signal component and the speckle pattern component are not affected by the frame correlation. The correlation coefficient $\beta$ is set to a medium value when $\epsilon$ is large and $\gamma$ is small, as shown in Table 2, so that the relatively strong frame correlation processing is performed and the random noise can be reduced.

(2) In a case wherein the probe is fixed but the path of the ultrasonic wave is slightly changed due to the respiration and heartbeat of a patient (corresponding to "Slight Motion" in Table 1):

The signal component is slightly changed but the speckle pattern component is greatly changed between frames ($\epsilon$ is small and $\gamma$ is large), as shown in Table 1. The raster correlation of the signal component is the same as that in the case of the still image ($\gamma$ is large). The raster correlation parameter of the speckle pattern component is medium. For the random noise component, $\epsilon$ is large and $\gamma$ is small as in the case of the still image.

As a result, the correlation coefficient $\beta$ is set to a medium value when $\epsilon$ is large and $\gamma$ is medium, as shown in Table 2, so that the weak frame correlation processing is performed and the speckle pattern can be reduced. The correlation coefficient $\beta$ is set to a large value when $\epsilon$ is small and $\gamma$ is large, as shown in Table 2, so that the strong frame correlation processing is performed. In this case, since the interframe difference of the signal component is zero, the signal component is invariable even if any strong frame correlation processing is performed. The correlation coefficient β is set to a large value when ε is large and γ is small, as shown in Table 2, so that the strong frame correlation processing is performed and the random noise component can be reduced.

(3) In a case wherein the probe is moved to change the slice to be scanned (corresponding to "Motion Image" in Table 1):

The signal component is greatly changed between frames (ε is large), as shown in Table 1. The raster correlation of the signal component is weak as in the above two cases (γ is large). This is because the raster correlation of the signal component is dependent on azimuth resolution, and the raster correlation is weak at a normal raster density and is not dependent on the motion of an image.

As a result, the correlation coefficient β is set to zero when ε is large and γ is large, as shown in Table 2, so that the frame correlation processing is not performed and the blurring of the image is prevented. The correlation coefficient β is set to a medium value when ε is large and γ is small, as shown in Table 2, so that the relatively strong frame correlation processing is performed and the random noise is reduced. The correlation coefficient β is set to a small value when ε is large and γ is medium, as shown in Table 2, so that the weak frame correlation processing is performed and the speckle pattern is reduced.

As has been described above, according to this embodiment, the type of image (a motion image, an image with a slight motion, or a still image) is detected on the basis of the difference ε between the frames of image signals, and the raster correlation γ within the current frame, and the frame correlation coefficient β is changed in accordance with the detection result, as shown in FIG. 4 and Table 2, thus performing proper frame correlation processing. Therefore, when a doctor or an operator moves the probe high speed to quickly observe the entire body of a patient (ε of the signal component is large), the frame correlation coefficient β is reduced as shown in FIG. 4, and blurring between frames is suppressed, thus obtaining an excellent realtime image. In contrast to this, when the operator stops the probe to observe a certain portion in detail (ε of the signal component is zero), the frame correlation coefficient β is increased, and a clear image with suppressed noise can be obtained. Further, a case in which the probe is moved is discriminated, based on the combination of the parameters β and γ, from a case in which the probe is not moved but only the path of an ultrasonic wave is slightly changed due to a slight motion of a patient and the speckle pattern is generated. Therefore, it is prevented that the frame correlation is excessively weakened.

Since the doctor is not required to change the frame correlation coefficient β for each operation, his/her load is reduced, and the time required for ultrasonic diagnosing is shortened.

As has been described above, according to the present invention, there is provided an ultrasonic diagnosing apparatus which can always perform proper frame correlation processing by separately detecting a slight motion only causing a speckle pattern and a motion image in which the signal component is changed, and changing the frame correlation coefficient in accordance with the detection result, and can obtain a tomographic image with a high S/N ratio.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, in the above embodiment, a motion of the image is detected by using three items of data, i.e., interpolated data of the current frame and data on two rasters on both sides of the interpolated data, and one item of data of the corresponding pixel in the previous frame. However, a plurality of frame memories may be used to use data at the same pixel among a plurality of frames, e.g., a frame prior to the current frame by one, a frame prior to the current frame by two, . . . and/or data of adjacent pixels.

Furthermore, in the above embodiment, a recursive digital filter of first order is used for processing the interpolated pixel data of the current frame and the pixel data of the previous frame prior to the current frame by one in a frame correlation processing. However, a recursive digital filter of any order except first may be formed by using a plurality of frame memories, as shown in FIG. 5. In FIG. 5, the recursive digital filter of third order is shown and the pixel data $y_n$ of the current frame is calculated as follows:

$$y_n = \beta_0 \times x_n + \beta_1 \times y_{n-1} + \beta_2 \times y_{n-2} \quad (3)$$

where $\beta_0$, $\beta_1$ and $\beta_2$ ($\beta_0+\beta_1+\beta_2=1$) are represented by a function of interframe difference ε and raster correlation parameter γ, and ε is represented as follows:

$$\epsilon = \sqrt{(y_{n-1} - y_{n-2})^2 + (x_n - y_{n-1})^2} \quad (4)$$

It is also possible to use a nonrecursive digital filter formed by using a plurality of frame memories, as shown in FIG. 6. In FIG. 6, the pixel data γ n is represented as follows:

$$y_n = \beta_0 \times x_n + \beta_1 \times x_{n-1} + \beta_2 \times x_{n-2} \quad (5)$$

where $\beta_0$, $\beta_1$ and $\beta_2$ ($\beta_0+\beta_1+\beta_2=1$) are represented by a function of interframe difference ε and raster correlation parameter γ, and ε is represented as follows:

$$\epsilon = \sqrt{(x_{n-2} - x_{n-1})^2 + (x_n - x_{n-1})^2} \quad (6)$$

In addition, the interpolation circuit 46, the raster correlation detector 48, and the motion detector/frame correlation calculator 52 may be constituted by a ROM.

What is claimed is:

1. An ultrasonic diagnosing apparatus comprising:
   means for scanning an object to be examined with an ultrasonic wave and receiving reflected ultrasonic waves, in which said scanning means changes a radiation direction of the ultrasonic wave in a sector shape, and further including a pixel data detecting means comprising means for interpolating the pixel data from received signals of two adjacent scanning lines;
   means for storing a past tomographic image;
   means for calculating an interframe difference between current pixel data derived from the reflected ultrasonic waves received by said scanning means and corresponding pixel data of the past tomographic image stored in said storing means;
   means for detecting a raster correlation between two adjacent scanning lines of the reflected ultrasonic waves received by said scanning means;
   means for calculating a frame correlation coefficient based on the interframe difference and the raster correlation; and means for multiplying the interframe difference with the frame correlation coefficient and adding the result of multiplication to the past tomographic image stored in said storing means to produce a current tomographic image, wherein said scanning means comprises three buffer memories for storing reflected ultrasonic waves of a consecutive three scanning lines, one of said buffer memories being set to a write mode and another two buffer memories being set to a read mode and supplying read-out data to said interpolating means and raster correlation detecting means.

2. An ultrasonic diagnosing apparatus including an ultrasonic probe for scanning a diagnostic subject to be examined with an ultrasonic wave to obtain a current ultrasonic image of the diagnostic subject on the basis of reflected ultrasonic waves and for obtaining a current tomographic image of the diagnostic subject from the current ultrasonic image, comprising:

filter means for performing a frame correlation processing for the current ultrasonic image using a past tomographic image and a frame correlation coefficient to produce the current tomographic image;

means for detecting a type of motion of the current ultrasonic image employing both (i) an interframe difference in image data between the current ultrasonic image and the past tomographic image and (ii) a raster correlation between two adjacent scanning lines of the current ultrasonic image in a correlation calculation; and means for changing the frame correlation coefficient used in the frame correlation processing performed by the filter means nonlinearly in accordance with the type of motion of the image detected by said detecting means, wherein said ultrasonic probe changes a radiation direction of the ultrasonic wave in a sector shape, and further including means for interpolating pixel data between two adjacent scanning lines of the current ultrasonic image.

3. The ultrasonic diagnosing apparatus according to claim 1, in which said frame correlation coefficient calculating means calculates a small frame correlation coefficient when the interframe difference is large and the raster correlation is weak.

4. The ultrasonic diagnosing apparatus according to claim 1, in which said frame correlation coefficient calculating means calculates a medium frame correlation coefficient when the interframe difference is large and the raster correlation is strong.

5. The ultrasonic diagnosing apparatus according to claim 1, in which said frame correlation coefficient calculating means calculates a large frame correlation coefficient when the interframe difference is small and the raster correlation is weak.

\* \* \* \* \*